3,824,261
BIOLOGICALLY ACTIVE MIXED ANHYDRIDES
Clive A. Henrick and John B. Siddall, Palo Alto, Calif.,
assignors to Zoecon Corporation, Palo Alto, Calif.
No Drawing. Filed Oct. 25, 1972, Ser. No. 300,554
Int. Cl. A23j 7/00; C07f 9/02
U.S. Cl. 260—403                    8 Claims

ABSTRACT OF THE DISCLOSURE

Mixed anhydrides of aliphatic substituted diolefinic carboxylic acids and dialkyl phosphoric acid, useful as insect control agents, bactericides and fungicides.

---

This invention relates to novel diolefinic phosphorylated compounds and the control of insects. More particularly, the novel unsaturated phosphates and acyl of the present invention are represented by the following formula A:

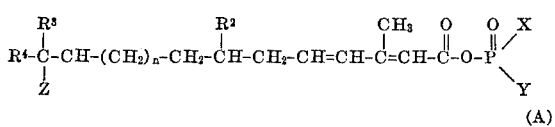

wherein,

Z is hydrogen, chloro, methyl, lower alkoxy, hydroxy or methylthio;

$n$ is zero or the positive integer one;

each of $R^2$ and $R^3$ is methyl or ethyl and $R^4$ is lower alkyl;

$R^5$ is hydrogen or methyl; and each of X and Y is —O benzyl, —O phenyl, or —O alkyl.

The compounds of formula A are useful for the control of insects. The utility of these compounds as insect control agents is believed to be attributable to their juvenile hormone activity. They are preferably applied to the immature insect, namely, during the embryo, larvae or pupae stages in view of their effect on metamorphosis and otherwise causing abnormal development leading to death or to inability to reproduce. These compounds are effective control agents for Heteropterans, such as Lygaeidae, Miridae and Pyrrhocoridae; Homopterans, such as Aphididate, Coccidae and Jassidae; Lepidopterans, such as Pyralidae, Noctuidae and Gelechiidae; Coleopterans, such as Tenebrionidae, Crysomelidae and Dermestidae; Dipterans, such as Culicidae, Muscidae and Sarcophagidae; and other insects. The compounds can be applied at low dosage levels of the order of 0.01 μg. to 10 μg. per insect. Suitable carrier substances include liquid or solid inert carriers, such as water, acetone, xylene, mineral or vegetable oils, talc, vermiculite, natural and synthetic resins and silica. Treatment of insects in accordance with the present invention can be accomplished by spraying, dusting or otherwise contacting the insect, directly or indirectly, with one or more compounds of formula A. Generally, a concentration of less than 25% of the active compound is employed. The formulations can include insect attractants, emulsifying agents or wetting agents to assist in the application and effectiveness of the active ingredient.

In the description hereinafter, each of $R^2$–$R^5$, Z, X and Y, and $n$ is as defined above, unless otherwise specified.

The novel compounds of formula A can be prepared by the silver salt method which entails the reaction between an acid halide, preferably the chloride, of formula (B) and a salt, preferably the silver salt of the second acid (I) in an inert solvent. The synthesis can be outlined as follows:

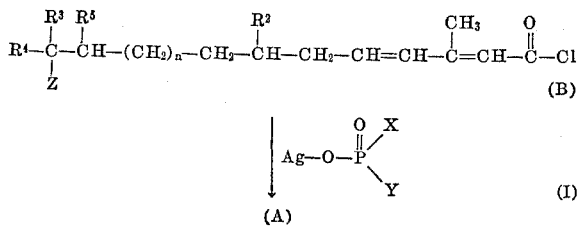

The starting material acid chlorides of formula (B) have been fully described in Belgian Pats. No. 778,241 and No. 778,242 and our U.S. Application Ser. No. 256,605 filed May 24, 1972, the disclosure of which is incorporated by reference, and can be prepared according to the procedures reported therein.

The dialkyl phosphates precursors for the compounds of formula (I) are commercially available or can be prepared as described in the literature. The preparation of their corresponding silver salts (I) and further reaction with the acid chlorides (B) can be carried out according to the procedures of Sheehan and Frank, *J. Amer. Chem. Soc.* 72, 1312 (1950).

The term "alkyl," as used herein, refers to a straight or branched chain saturated aliphatic hydrocarbon group having a chain length of one to twelve carbon atoms, such as methyl, ethyl, n-propyl, i-propyl, n-butyl, n-hexyl, n-amyl, n-heptyl, n-octyl, n-nonyl, lauryl, n-decyl, t-amyl, 3-ethylpentyl and 2-methylhexyl.

The term "lower alkyl," as used herein, refers to a straight or branched chain saturated aliphatic hydrocarbon group having a chain length of one to six carbon atoms, e.g., methyl, ethyl, propyl, i-propyl, n-butyl, s-butyl, t-butyl, pentyl and hexyl.

The term "lower alkoxy," as used herein, refers to an alkoxy group of one to six carbon atoms such as methoxy, ethoxy, isopropoxy, etc.

In addition to the compounds of the present invention having activity useful for the control of insects, the compounds of formula A have other useful applications and can be used, for example, as bactericides and fungicides due to the broad spectrum antibacterial and antifungal activity that they possess.

The following examples are provided to illustrate the general practice of the present invention. Temperature is given in degrees Centigrade.

EXAMPLE 1

(A) To a hot, concentrated aqueous solution of 6.1 g. of silver nitrate is added in the dark a solution of 10.0 g. of dibenzyl phosphate in about 100 ml. of 50% alcohol containing 1.44 g. of sodium hydroxide. The mixture is stored in the dark for two days and then filtered. The filtrate is concentrated to a volume of about 20 ml., filtered and the combined residues are washed with water and with alcohol. The colorless crystalline product is pulverized and dried at 75° for twelve hours and at 110° (0.5 mm.) for six hours to give silver dibenzyl phosphate (I; each of X and Y is —O benzyl).

(B) A solution of 3,7,11-trimethyldodeca-2,4-dienoyl chloride (2.7 g.) in dry benzene (100 ml.) is shaken with 4.6 g. of silver dibenzyl phosphate for four hours at room temperature. A second portion of the silver salt (1.15 g.) is added and the suspension is shaken for two additional hours. The precipitate of silver chloride and excess silver dibenzyl phosphate is removed by filtration. The benzene solution is filtered with Celite to eliminate traces of silver salts and evaporated to dryness in vacuo to yield 3,7,11-trimethyldodeca-2,4-dienoyl dibenzyl phosphate (A; each of $R^1$, $R^2$, $R^3$ and $R^4$ is methyl; $R^5$ is hydrogen; each of Z and Z' is hydrogen; each of $m$ and $n$ is one; and each of X and Y is —O benzyl).

By preparing the silver salt of each of diphenyl phosphate, diisopropyl phosphate, as described in Part A and using it in place of silver dibenzyl phosphate in the process of Part B, there is obtained the corresponding 3,7,11-trimethyldodeca-2,4-dienoic acid mixed anhydride.

Similarly, each of the acid chlorides and Column I is reacted with silver dibenzyl phosphate to give the respective acyl phosphate under Column II.

I 11-methoxy-3,7,11-trimethyldodeca-2,4-dienoyl chloride,
11-hydroxy-3,7,11-trimethyldodeca-2,4-dienoyl chloride,
11-chloro-3,7,11-trimethyldodeca-2,4-dienoyl chloride,
11-methylthio-3,7,11-trimethyldodeca-2,4-dienoyl chloride,
3,7,11,11-tetramethyldodeca-2,4-dienoyl chloride,
10-methylthio-3,7,10-trimethylundeca-2,4-dienoyl chloride,
11-methoxy-3,11-dimethyl-7-ethyltrideca-2,4-dienoyl chloride,
3,7,10,11-tetramethyldodeca-2,4-dienoyl chloride.

II 11-methoxy-3,7,11-trimethyldodeca-2,4-dienoyl dibenzyl phosphate,
11-hydroxy-3,7,11-trimethyldodeca-2,4-dienoyl dibenzyl phosphate,
11-chloro-3,7,11-trimethyldodeca-2,4-dienoyl dibenzyl phosphate,
11-methylthio-3,7,11-trimethyldodeca-2,4-dienoyl dibenzyl phoshate,
3,7,11,11-tetramethyldodeca-2,4-dienoyl dibenzyl phosiphate,
10-methylthio-3,7,10-trimethylundeca-2,4-dienoyl dibenzyl phosphate,
11-methoxy-3,11-dimethyl-7-ethyltrideca-2,4-dienoyl dibenzyl phosphate,
3,7,10,11-tetramethyldodeca-2,4-dienoyl dibenzyl phosphate.

Example 2

Each of the acid chlorides under Col. III is reacted with the silver salt of dimethylphosphate to yield the mixed anhydride under Col. IV.

III 3,7,11-trimethyldodeca-2,4-dienoyl chloride
11-methoxy-3,7,11-trimethyldodeca-2,4-dienoyl chloride
11-ethoxy-3,7,11-trimethyldodeca-2,4-dienoyl chloride
11-methylthio-3,7,11-trimethyldodeca-2,4-dienoyl chloride

IV 3,7,11-trimethyldodeca-2,4-dienoyl dimethyl phosphate
11-methoxy-3,7,11-trimethyldodeca-2,4-dienoyl dimethyl phosphate
11-methoxy-3,7,11-trimethyldodeca-2,4-dienoyl dimethyl phosphate
11-methylthio-3,7,11-trimethyldodeca-2,4-dienoyl dimethyl phospate Each of the di- (n-butyl) phosphates under Col. V is prepared by the reaction of the silver salt of di- (n-butyl) phosphate with each of the acid chlorides under col. III.

V 3,7,11-trimethyldodeca-2,4-dienoyl di-(n-butyl) phosphate
11-methoxy-3,7,11-trimethyldodeca-2,4-dienoyl di- (n-butyl) phosphate,
11-ethoxy-3,7,11-trimethyldodeca-2,4-dienoyl di- (n-butyl) phosphate,
11-methylthio-3,7,11-trimethyldodeca-2,4-dienoyl di- (n-butyl) phosphate

EXAMPLE 3

Similarly, reaction of the silver salt of diethyl phosphate and di- (n-propyl) phosphate with the acid chlorides under Col. III produces the respective mixed anhydride.

3,7,11-trimethyldodeca-2,4-dienoyl diethyl phosphate,
11-methoxy-3,7,11-trimethyldodeca-2,4-dienoyl diethyl phosphate,
11-ethoxy-3,7,11-trimethydodeca-2,4,-dienoyl diethyl phosphate,
11-methylthio-3,7,11-trimethyldodeca-2,4-dienoyl diethyl phosphate,
3,7,11-trimethyldodeca-2,4-dienoyl di- (n-propyl) phosphate
11-methoxy-3,7,11-trimethyldodeca-2,4-dienoyl di- (n-propyl) phosphate,
11-ethoxy-3,7,11-trimethyldodeca-2,4-dienoyl di- (n-propyl) phosphate
11-methylthio-3,7,11-trimethyldodeca-2,4-dienoyl di- (n-propyl) phosphate

What is claimed is:

1. A compound of formula A:

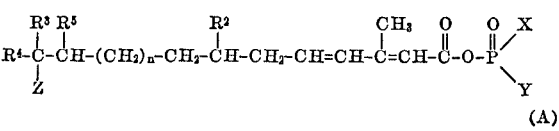

(A)

wherein,

Z is hydrogen, chloro, methyl, lower alkoxy of one to six carbon atoms, hydroxy, or methylthio;
$n$ is zero or one;
each of $R^2$ and $R^3$ is methyl or ethyl;
$R^4$ is lower alkyl of one to six carbon atoms;
$R^5$ is hydrogen or methyl; and
X and Y are —O—benzyl, —O—phenyl, or —O—alkyl.

2. A compound according to Claim 1 wherein $n$ is one and $R^4$ is lower alkyl of one to three carbon atoms.

3. A compound according to Claim 2 wherein each of $R^2$, $R^3$ and $R^4$ is methyl.

4. A compound according to Claim 3 wherein Z is hydrogen or methyl.

5. A compound according to Claim 3 wherein Z is hydroxy, methoxy, or ethoxy.

6. A compound according to Claim 3 wherein Z is chloro or methylthio.

7. A compound according to claim 3 wherein Z is lower alkoxy of one to four carbon atoms.

8. A compound according to Claim 7 wherein $R^5$ is hydrogen and Z is methoxy or ethoxy.

References Cited

UNITED STATES PATENTS 3,697,560   10/1972   Henrick et al. _____ 260—400
3,697,561   10/1972   Henrick et al. _____ 260—400

ELBERT L. ROBERTS, Primary Examiner

U.S. Cl. X.R.

260—413